United States Patent
Smith

(10) Patent No.: US 10,891,648 B1
(45) Date of Patent: Jan. 12, 2021

(54) SYSTEMS AND METHODS FOR TRACKING THE FLOW OF USER INFORMATION OVER A NETWORK

(71) Applicant: Symantec Corporation, Mountain View, CA (US)

(72) Inventor: Spencer Smith, El Segundo, CA (US)

(73) Assignee: NORTONLIFELOCK, INC., Tempe, AZ (US)

( * ) Notice: Subject to any disclaimer, the term of this patent is extended or adjusted under 35 U.S.C. 154(b) by 780 days.

(21) Appl. No.: 15/451,704

(22) Filed: Mar. 7, 2017

(51) Int. Cl.
*G06Q 30/02* (2012.01)
*H04L 29/08* (2006.01)
*H04L 12/26* (2006.01)
*G06F 21/62* (2013.01)

(52) U.S. Cl.
CPC ..... *G06Q 30/0241* (2013.01); *G06F 21/6263* (2013.01); *H04L 43/06* (2013.01); *H04L 67/22* (2013.01)

(58) Field of Classification Search
CPC . G06Q 30/0241; G06F 21/6263; H04L 67/22; H04L 43/06
See application file for complete search history.

(56) References Cited

U.S. PATENT DOCUMENTS

| | | | | |
|---|---|---|---|---|
| 2008/0103900 A1* | 5/2008 | Flake | ..................... | G06Q 30/02 705/14.41 |
| 2011/0087519 A1* | 4/2011 | Fordyce, III | ....... | G06Q 30/0201 705/7.29 |
| 2015/0088739 A1* | 3/2015 | Desai | ................... | G06Q 20/382 705/42 |
| 2015/0371347 A1* | 12/2015 | Hayward | ............... | G16H 50/30 705/314 |
| 2015/0372770 A1* | 12/2015 | Ouzounov | ........... | H04B 13/005 455/41.2 |

OTHER PUBLICATIONS

Schelter et al. Automatically Tracking Metadata and Provenance of Machine Learning Experiments. Machine Learning Systems Workshop at NIPS, 2017. (Year: 2017).*

(Continued)

*Primary Examiner* — William A Brandenburg
*Assistant Examiner* — Christopher C Busch
(74) *Attorney, Agent, or Firm* — FisherBroyles, LLP

(57) ABSTRACT

A computer-implemented method for tracking the flow of user information over a network may include (i) recording user information transmitted from a user's computing device, (ii) identifying at least one third-party communication that utilizes at least a portion of the user information, (iii) deriving communication metadata from the third-party communication, (iv) generating, based on the communication metadata and the recorded user information, an information flow report that describes (A) the user information that was transmitted over the network connection, (B) at least one third-party communication that utilized elements of the user information, and (C) at least one element of user information utilized by the third-party communication, and (v) providing the information flow report to the user via a graphical user interface (GUI). Various other methods, systems, and computer-readable media are also disclosed.

18 Claims, 7 Drawing Sheets

(56) References Cited

OTHER PUBLICATIONS

Clickstream, https://en.wikipedia.org/wiki/Clickstream, as accessed Feb. 21, 2017, Wikipedia.
Mozilla Lightbeam for Firefox, https://addons.mozilla.org/en-US/firefox/addon/lightbeam/, as accessed Feb. 21, 2017, Mozilla (Jul. 14, 2016).
Polakis, et al; "Social Forensics: Searching for Needles in Digital Haystacks"; http://nsl.cs.columbia.edu/papers/2015/forensics.badgers15.pdf; as accessed Feb. 21, 2017; Columbia University.
Ghostery, https://www.ghostery.com/, as accessed Feb. 21, 2017, Ghostery.

* cited by examiner

SYSTEMS AND METHODS FOR TRACKING THE FLOW OF USER INFORMATION OVER A NETWORK

BACKGROUND

As increasing amounts of commerce and other activities take place over networks such as the Internet, companies increasingly seek to monetize user interactions with online content. In order to monetize user interactions with services such as online stores, social media, etc., various companies track and trade user information such as content that the user searches for, pages that they browse to, how long they spend viewing content, and so forth. Companies that track this data may then sell this information to advertisers and other service providers, who then use the information to perform targeted advertising and/or services tailored to each individual user.

On the other hand, users may wish to control and/or moderate the flow of their information. For example, users may want to ensure that websites promising to adhere to a "do-not-track" policy actually adhere to the policy. Users may also seek to avoid sharing personal information with sites and services that might abuse their information. Unfortunately, the process of tracking and trading user information generally happens out of the view of the user. As such, users may remain unaware of how information they share with websites affects their browsing experience, and whether or not information is being shared in a manner approved by the user. The instant disclosure, therefore, identifies and addresses a need for systems and methods for tracking the flow of user information over a network.

SUMMARY

As will be described in greater detail below, the instant disclosure describes various systems and methods for tracking the flow of user information over a network. In one example, a computer-implemented method for tracking the flow of user information over a network may include (i) recording user information transmitted from a user's computing device over a network connection, (ii) identifying at least one third-party communication that utilizes at least a portion of the user information, (iii) deriving communication metadata from the third-party communication that describes both the third-party communication and the portion of the user information utilized by the third-party communication, (iv) generating, based on the communication metadata and the recorded user information, an information flow report that describes (A) the user information that was transmitted over the network connection, (B) at least one third-party communication that utilized elements of the user information, and (C) at least one element of user information utilized by the third-party communication, and (v) providing the information flow report to the user via a graphical user interface (GUI).

In some embodiments, identifying the third-party communication may include searching an information exchange market for transactions that include the portion of the user information. In some examples, the information exchange market may include a real-time bidding advertising exchange. Additionally or alternatively, deriving the communication metadata from the third-party communication may include identifying at least one purchaser that viewed the portion of the user information on the information exchange market.

In further embodiments, identifying the third-party communication may include examining at least one inbound network connection to the user's computing device for communications that include the portion of the user information. In one embodiment, this inbound network connection may originate from a server known to be associated with an advertising service.

In certain embodiments, the computer-implemented method may further include prompting, via the GUI, the user to initiate a security action that mitigates potential abuse of the user information. In some examples, performing the security action may include (i) notifying a website of a possible misuse of user information, (ii) blacklisting an abusing website from receiving at least one element of user information, and/or (iii) whitelisting a reputable website to receive at least one element of user information.

In some examples, generating the information flow report may include calculating a prevalence score for each element of user information included in the information flow report. This prevalence score may represent the number of third-party communications observed to utilize the element of user information.

In some embodiments, the portion of the user information may include (i) a target Uniform Resource Locator (URL) of the network connection, (ii) a parameter delivered to the target of the network connection, (iii) an externally visible Internet Protocol (IP) address of the user's computing device, and/or (iv) information delivered over the network connection as part of a HyperText Transfer Protocol (HTTP) POST operation.

The above-described method may include recording the user information in a variety of contexts. For example, recording the user information transmitted from the user's computing device may include recording the user information at a gateway network device that facilitates network traffic for the user's computing device.

In one embodiment, a system for implementing the above-described method may include (i) a recording module, stored in memory, that records user information transmitted from a user's computing device over a network connection, (ii) an identification module, stored in memory, that identifies at least one third-party communication that utilizes at least a portion of the user information, (iii) a deriving module, stored in memory, that derives communication metadata from the third-party communication that describes both the third-party communication and the portion of the user information utilized by the third-party communication, (iv) a generation module, stored in memory, that generates, based on the communication metadata and the recorded user information, an information flow report that describes: (A) the user information that was transmitted over the network connection and (B) at least one third-party communication that utilized elements of the user information, and (C) at least one element of user information utilized by the third-party communication, (v) a providing module, stored in memory, that provides the information flow report to the user via a graphical user interface (GUI), and (vi) at least one physical processor configured to execute the recording module, the identification module, the deriving module, the generation module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) record user information transmitted from a user's computing device over a network connection, (ii) identify at least one third-party communication that utilizes at least a portion of the user information, (iii) derive communication metadata from the third-party communication that describes both the third-party communication and the portion of the user information utilized by the third-party communication, (iv) generate, based on the communication metadata and the recorded user information, an information flow report that describes (A) the user information that was transmitted over the network connection, (B) at least one third-party communication that utilized elements of the user information and (C) at least one element of user information utilized by the third-party communication, and (v) provide the information flow report to the user via a graphical user interface (GUI).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
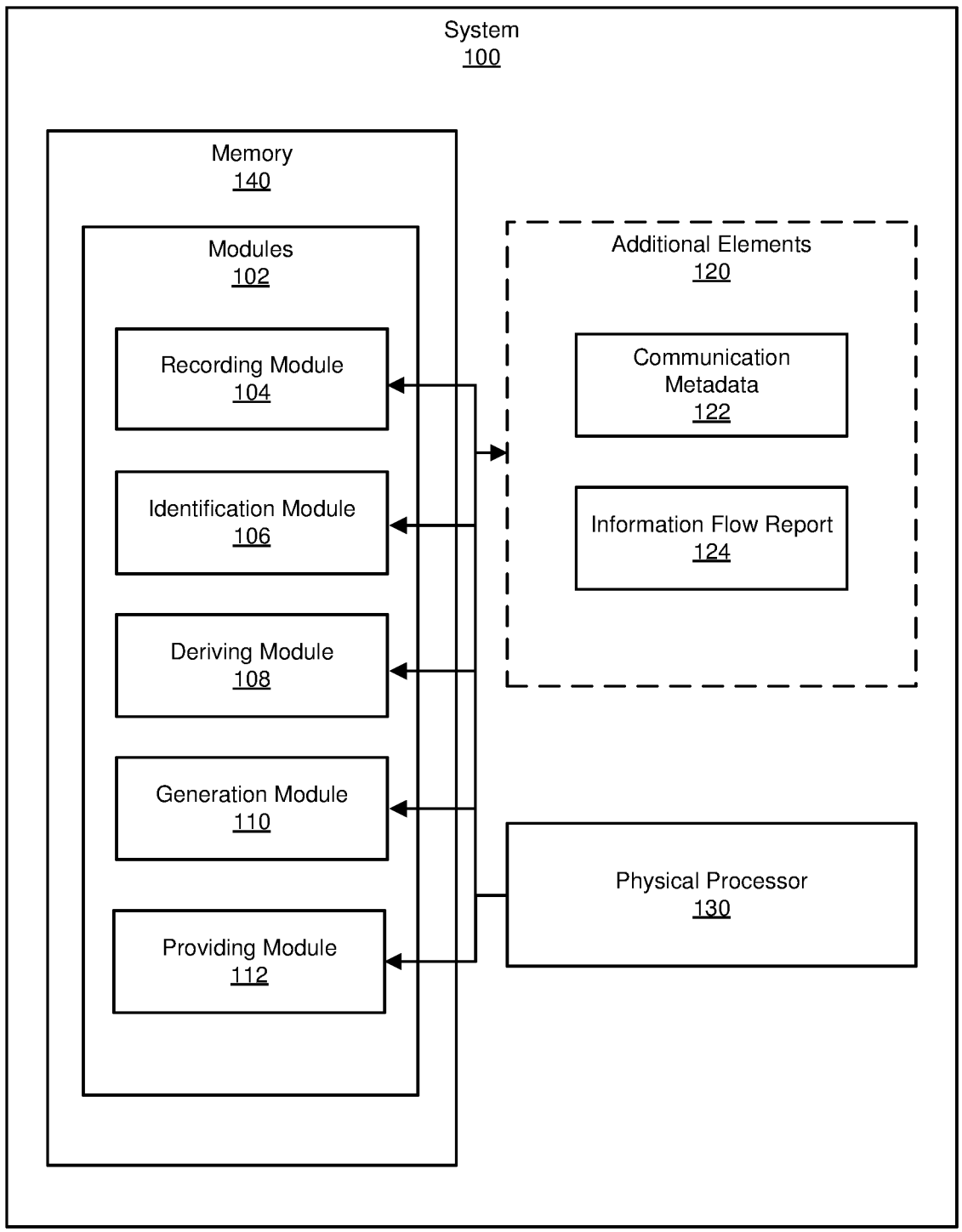
FIG. 1 is a block diagram of an example system for tracking the flow of user information over a network.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for tracking the flow of user information over a network. As will be described in greater detail below, the systems and methods described herein may improve the fields of digital security and digital privacy by enhancing users' control over their personal information by providing visual representations of the flow of such information through a network. These information flow reports may be generated by observing key points of information transfer, including but not limited to when the user's information leaves their system, points at which the information is publicly traded such as at advertising exchanges, and when communications affected by the transaction of the information return back to the user's computer. Furthermore, user interfaces associated with the presentation of this information to end users may further enhance users' control over their personal information by allowing them to prompt various software security systems to perform a variety of security functions related to controlling the flow of personal information. For example, a user might prompt a security system to restrict or even block the flow of personal information to sites and services that might abuse access to user information, mishandle data, or otherwise use the information in an undesirable fashion.

In addition, the systems and methods described herein may improve the functioning of a computing device by enabling the computing device to present users with context and control options to manage the flow of their personal information. These systems and methods may also enhance the fields of digital security and privacy by providing users with the contextual information that they need to make informed decisions about how to control their personal information.

Figure 2:
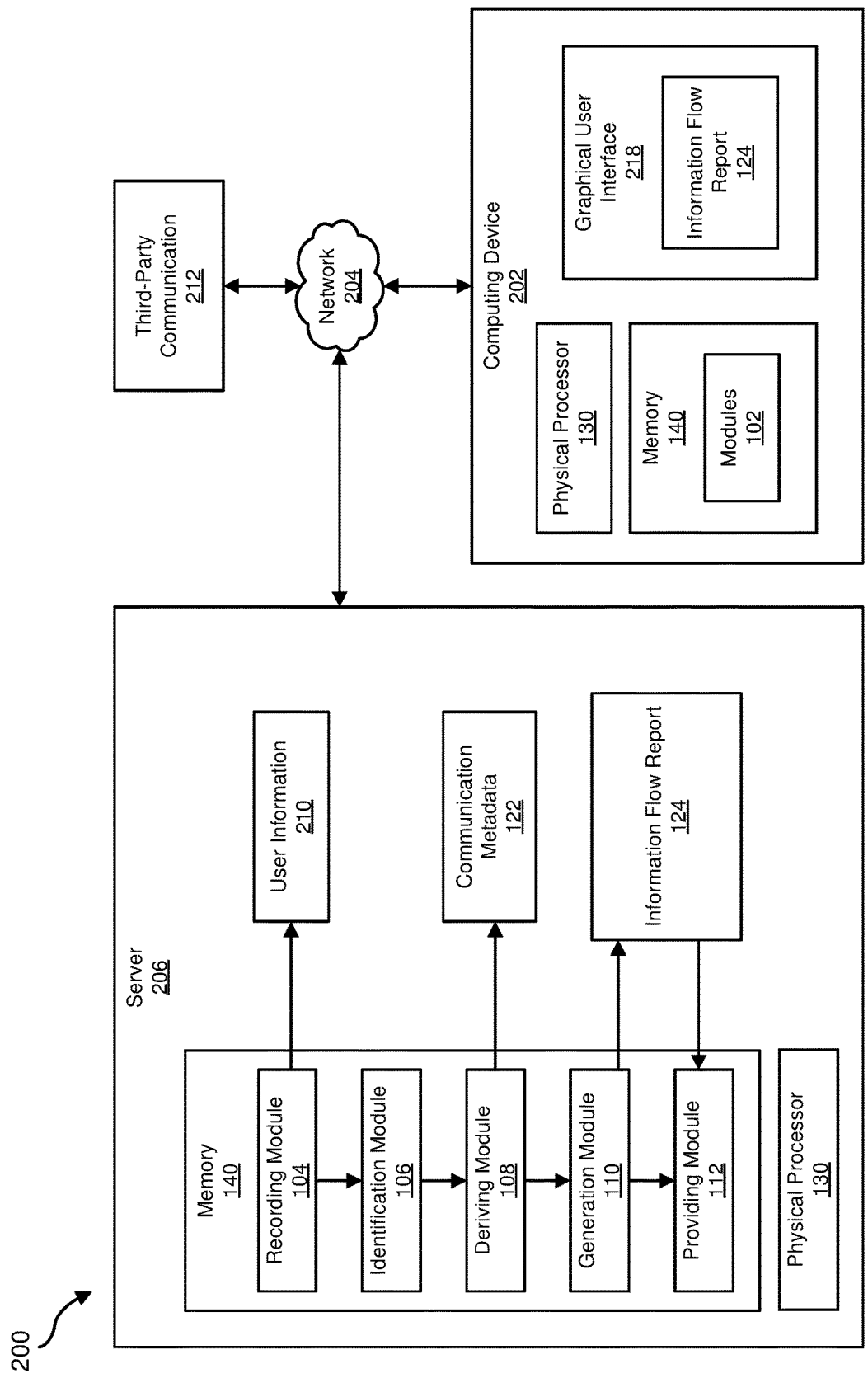
FIG. 2 is a block diagram of an additional example system for tracking the flow of user information over a network.

The following will provide, with reference to FIGS. 1-2, detailed descriptions of example systems for tracking the flow of user information over a network. Detailed descriptions of corresponding computer-implemented methods will also be provided in connection with FIG. 3. Detailed descriptions of an example flow of user information through networks will be provided in connection with FIG. 4, and detailed descriptions of an example GUI for communicating information flow reports to end users will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of example system 100 for tracking the flow of user information over a network. As illustrated in this figure, example system 100 may include one or more modules 102 for performing one or more tasks. For example, and as will be explained in greater detail below, example system 100 may include a recording module 104 that records user information transmitted from a user's computing device over a network connection. Example system 100 may additionally include an identification module 106 that identifies at least one third-party communication that utilizes at least a portion of the recorded user information. Example system 100 may also include a deriving module 108 that derives communication metadata 122 from the third-party communication. Communication metadata 122 may describe both the third-party communication and the portion of the user information utilized by the third-party communication. Example system 100 may further include a generation module 110 that generates, based on communication metadata 122 and the recorded user information, an information flow report 124 that describes (A) the user information that was transmitted over the network connection, (B) at least one third-party communication that utilized elements of the user information, and (C) at least one element of user information utilized by the third-party communication. Example system 100 may also include a providing module 112 that provides information flow report 124 to the user via a graphical user interface (GUI). Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate tracking the flow of user information over a network. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Furthermore, example system 100 may generate communication metadata 122, which generally represents any type or form of information that describes a network communication. The term "network communication," as used herein, generally refers to any type or form of electronic signaling between two or more computing devices over a network such as the Internet. Computing devices may use network communications to transfer files, instruct other computing devices to perform actions, share data (e.g., user information), etc. Metadata describing network communications may include information such as a target Uniform Resource Locator (URL) of the communication, parameters delivered over the network communication (e.g., parameters delivered to a script, such as a JAVASCRIPT script), externally visible Internet Protocol (IP) addresses of one or more computing devices involved in the communication, information delivered via the communication, an organization name associated with one or more computing devices involved in the communication, a reputation of one or more computing devices involved in the communication, header information derived from the network communication, combinations of one or more of the same, or any other suitable information used to describe a network communication and/or its contents.

Moreover, example system 100 may generate information flow report 124. As will be described in greater detail below, information flow report 124 generally represents information describing how information a user transmits over a network affects information coming back to them. For example, a user searching for violin rosin on AMAZON.COM may begin seeing advertisements for violins and/or instrument repair on websites other than AMAZON.COM. Information flow report 124 may contain information that provides insight into how searching for "violin rosin" caused advertisements presented to the user to change. Information flow report 124 may take a variety of forms. In some embodiments, information flow report 124 may include a table correlating elements of user information to advertising networks, service providers, and other online entities that used those elements of user information as part of delivering content to the user. Additionally or alternatively, information flow report 124 may include graphs and/or other illustrations providing a visual representation of how a user's information moved through a network, such as the flow graph shown in FIG. 5. Information flow report 124 may also contain any other suitable visualizations of the flow of user information through a network. These visualizations may be provided through a graphical user interface (GUI) to inform users as to how their data might be used by third parties, as will be described in greater detail below.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to monitor the flow of user information through a network and generate a report describing this flow of information. For example, and as will be described in greater detail below, recording module 104 may record user information 210 transmitted from computing device 202 over a network such as network 204. Identification module 106 may identify at least one third-party communication 212 that utilizes at least a portion of user information 210. Deriving module 108 may derive communication metadata 122 from third-party communication 212 that describes both third-party communication 212 and the portion of user information 210 utilized by third-party communication 212. Generation module 110 may generate, based on communication metadata 122 and user information 210, an information flow report 124 that describes the user information that was transmitted over the network, at least one third-party communication (not necessarily third-party communication 212) that utilized elements of user information 210, and at least one element of user information 210 that was utilized by the third-party communication. Providing module 112 may then provide information flow report 124 to the user via a graphical user interface 218 (GUI).

Computing device 202 generally represents any type or form of computing device capable of reading computer-executable instructions. For example, computing device 202 may represent an end-user's personal computing device, such as their home computer or mobile phone, that they use to browse the Internet. In such an example, the user may install a security software system on computing device 202. Such a security software system may be designed to protect the user's online privacy, and incorporate all or a portion of the systems and methods described herein. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of monitoring and inspecting network traffic. For example, server 206 may represent a gateway device that handles network traffic for computing device 202. In some embodiments, server 206 may be capable of participating in advertising information exchanges. For example, server 206 may represent a server in a server farm managed by a digital privacy firm that scans advertising information exchanges for the trading of information representing one or more subscribers to services offered by the digital privacy firm. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

User information 210 generally represents any type or form of information transmitted from a user's computing device over a network. This information may uniquely identify the device, such as by their externally visible IP address, an identifier from a cookie stored on the computer, and/or an account associated with the device. Additionally or alternatively, user information 210 may include information that the user provided to a service provider. For example, user information 210 may include parameters delivered to the target of a network connection and/or information delivered as part of an HTTP POST operation. Specifically, user information 210 may include information such as user account identifiers, search terms, demographic information, and/or any other information that a user may have provided to various online services. As described in greater detail above, services and service providers may use elements of user information 210 to tailor a user's browsing experience specifically to that user, and may use elements of information given to one online service to correlate a user profile with information given to a separate online service.

Third-party communication 212 generally represents any type or form of network communication that originates from a source other than the user's computing device. In some embodiments, the third-party communication may originate from an advertising exchange. For example, an advertising agency may bid for impressions via an advertising exchange. Third-party communication 212 may represent one or more network communications involved in this bidding process, such as the exchange announcing that it is selling an ad impression for a user. As an additional example, an advertising agency may serve an ad on a webpage viewed by the user. In this example, third-party communication 212 may represent the network connection providing the information necessary to display the advertisement. In further embodiments, the third-party communication may originate from a content provider that provides online content to computing device 202. In these embodiments, third-party communication 212 may represent the delivery of an advertisement to a browser running on computing device 202.

Graphical user interface 218 generally represents a visual representation of an information flow report that is provided to an end user through a visual user interface device, such as a screen or monitor. As will be described in greater detail below, graphical user interface 218 may perform a variety of functions beyond simply displaying information, such as allowing users to select different visualizations of different portions of an information flow report and/or initiate security actions to address information flows that they deem unacceptable.

Figure 3:
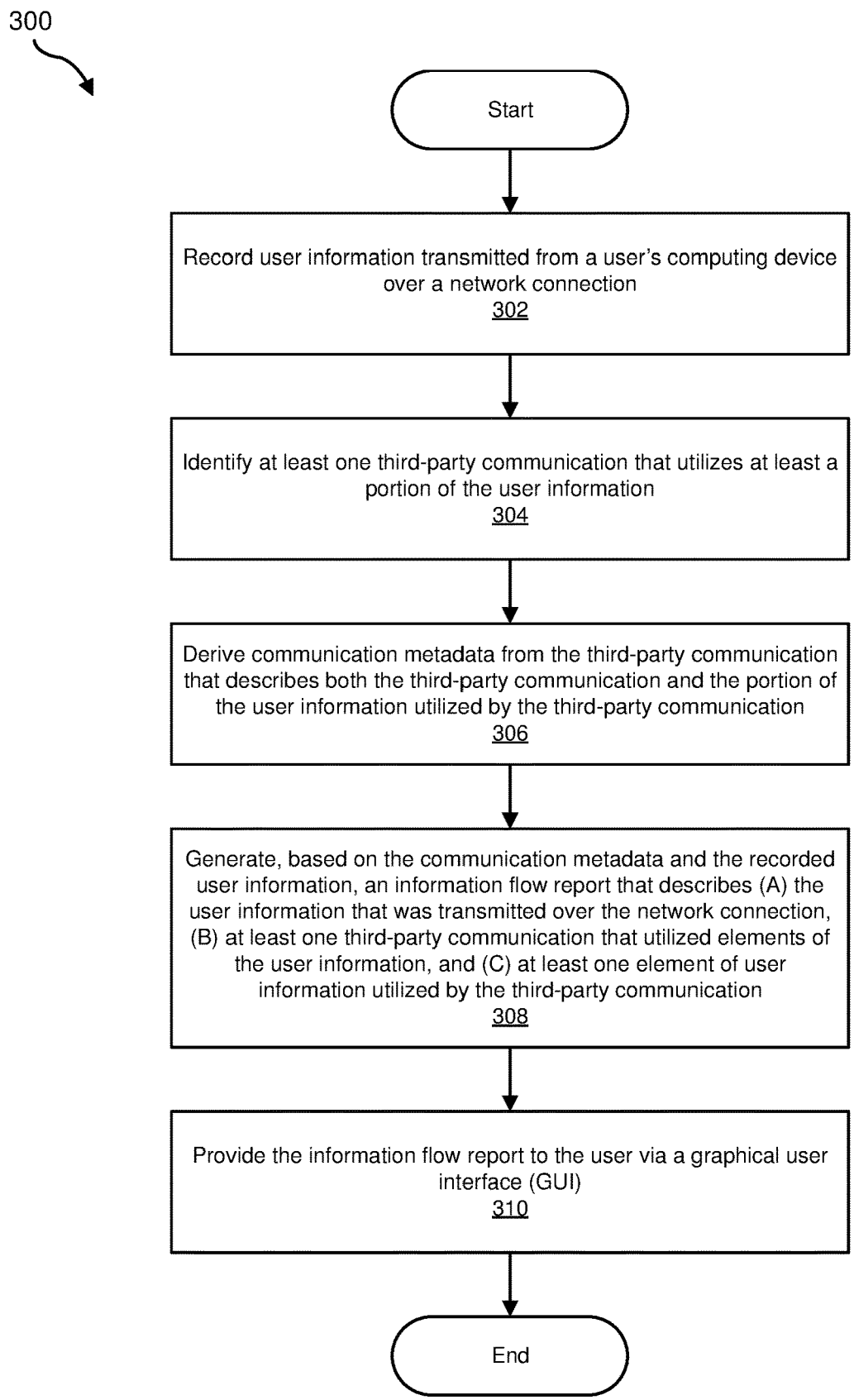
FIG. 3 is a flow diagram of an example method for tracking the flow of user information over a network.

FIG. 3 is a flow diagram of an example computer-implemented method 300 for tracking the flow of user information over a network. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may record user information transmitted from a user's computing device over a network connection. For example, recording module 104 may, as part of computing device 202 and/or server 206 in FIG. 2, record user information 210 transmitted from computing device 202 over network 204.

Recording module 104 may record user information 210 in a variety of contexts. In some embodiments, recording module 104 may execute directly on computing device 202. For example, recording module 104 may represent all or a portion of a browser extension that captures form data and HTTP POST operations transmitted via the browser. Additionally or alternatively, recording module 104 may operate as part of an internet security suite installed on computing device 202 that monitors network traffic to and from computing device 202. Recording module 104 may also execute as part of a gateway device that facilitates network communications for computing device 202. For example, recording module 104 may operate as part of a gateway software security suite installed on a gateway device, such as a Wi-Fi router or other network hub, that handles network traffic for multiple computing devices. In this example, recording module 104 may use network packet header information and/or any other suitable connection metadata to differentiate network communications associated with each protected computing device and record separate instances of user information 210 for each protected computing device.

Recording module 104 may also record different types of information for use as user information 210. In some embodiments, recording module 104 may record information that is actively provided by users, such as search terms entered into a search engine. In further embodiments, recording module 104 may record information that is provided by systems other than the user. For example, recording module 104 may determine an externally visible IP address for computing device 202 and record this IP address as part of user information 210. As an additional example, recording module 104 may record that a browser executing on computing device 202 transmitted a "do not track" signal as part of an outbound network communication. Recording module 104 may additionally or alternatively record any other suitable information relating to the user's network activity, such as a target URL of a network connection originating from computing device 202, a parameter delivered to the target of the network connection (e.g., as an input to a script), and/or information delivered over the network connection as part of an HTTP POST operation.

Once the user information has been recorded, the systems and methods described herein may scan various network communications for elements of the user information. At step 304 in FIG. 3, one or more of the systems described herein may identify at least one third-party communication that utilizes at least a portion of the user information. For example, identification module 106 may, as part of computing device 202 and/or server 206 in FIG. 2, identify at least one third-party communication 212 that utilizes at least a portion of user information 210.

As described in greater detail above, third-party communication 212 generally represents a network connection that originated from a source other than computing device 202 or server 206. Identification module 106 may identify third-party communication 212 in a variety of contexts. In some examples, identification module 106 may execute as part of an endpoint agent installed on computing device 202, such as a browser extension and/or component of a software security system. In these examples, identification module 106 may identify the third-party communication by examining and analyzing at least one inbound network connection to the user's computing device for communications that include the portion of the user information. As a specific example, identification module 106 may inspect headers of incoming network connections that may contain elements of user information 210. Identification module 106 may additionally or alternatively examine all or a portion of the payload delivered by the network connection for elements of user information 210.

In some embodiments, identification module 106 may conserve system resources by only performing in-depth analysis on inbound network connections that meet certain criteria. For example, identification module 106 may only inspect an inbound network connection if identification module 106 determines that the network connection originated from a computing device that is associated with a specific organization, such as a server known to be associated with an advertising service. Identification module 106 may determine that originating computing device is associated with a specific organization in a variety of ways, including but not limited to performing a WHOIS lookup on an IP address of the computing device through a public service, searching for the computing device on a privately maintained list of known computing devices that are associated with specific organizations, determining that a domain name associated with the computing device is associated with the specific organization, combinations of one or more of the same, and/or any other suitable method for identifying an organization associated with a computing device.

Additionally or alternatively, identification module 106 may execute at a gateway device that handles network traffic for computing device 202. For example, server 206 may operate as a gateway device for computing device 202. As a specific example, identification module 106 may execute as part of a software security system installed on the gateway device to monitor network traffic and protect computing devices (e.g., computing device 202) that connect to a larger network through the gateway device. In these examples, identification module 106 may identify network connections directed to computing device 202, such as by examining the headers of the network connections for fields that indicate the destination of the network connection. Identification module 106 may then analyze these identified network connections for elements of user information 210 in a manner parallel to the examples described in greater detail above.

In further examples, identification module 106 may execute as part of a server operated by an information security service that searches publicly available information and/or information exchanges for elements of user information 210. In some examples, identification module 106 may identify the third-party communication by searching an information exchange market for transactions that include the portion of the user information. Advertisers, online marketplaces, and other similar digital service providers may buy, sell, and/or trade user information over such information exchanges for the purpose of tailoring a user's browsing experience. For example, an advertiser may serve targeted ads to a user based on personal information such as the user's approximate physical location, search history, and/or purchase history after purchasing an ad impression slot for the user on an advertising exchange. Additionally, a service provider such as AMAZON.COM may sell some form of identifying information such as an external IP address in conjunction with users' search and purchase histories to an information exchange marketplace.

Such information exchange markets may include a real-time bidding (RTB) advertising exchange. In these examples, advertisers and/or other service providers bid in order to serve content to an end user. The RTB advertising exchange may identify the user using elements of their personal information (e.g., lives near Mountain View, Calif., has searched for "baby monitors" recently), and various third parties may bid on the opportunity to present content to that user. Identification module 106 may use the information available through RTB exchanges as some or all of third-party communication 212. For example, identification module 106 may identify one or more of the advertising exchange's announcements that a content bid is open as third-party communication 212.

Identification module 106 may also identify user information 210 in a variety of ways. In some examples, identification module 106 may observe a network communication that includes a single element of user information previously recorded by recording module 104 that is recognizable as being associated with the user. For example, identification module 106 may identify a network communication that shares the externally visible IP address of computing device 202. In other examples, identification module 106 may identify a network communication that contains multiple elements of user information 210. For example, identification module 106 may identify a network communication that utilizes HTTP POST data in conjunction with the externally visible IP address of computing device 202. As an additional example, identification module 106 may identify a network connection utilizing a username associated with the user that was submitted as part of an HTTP POST operation in conjunction with a search term submitted by the user to a search engine.

Figure 4:
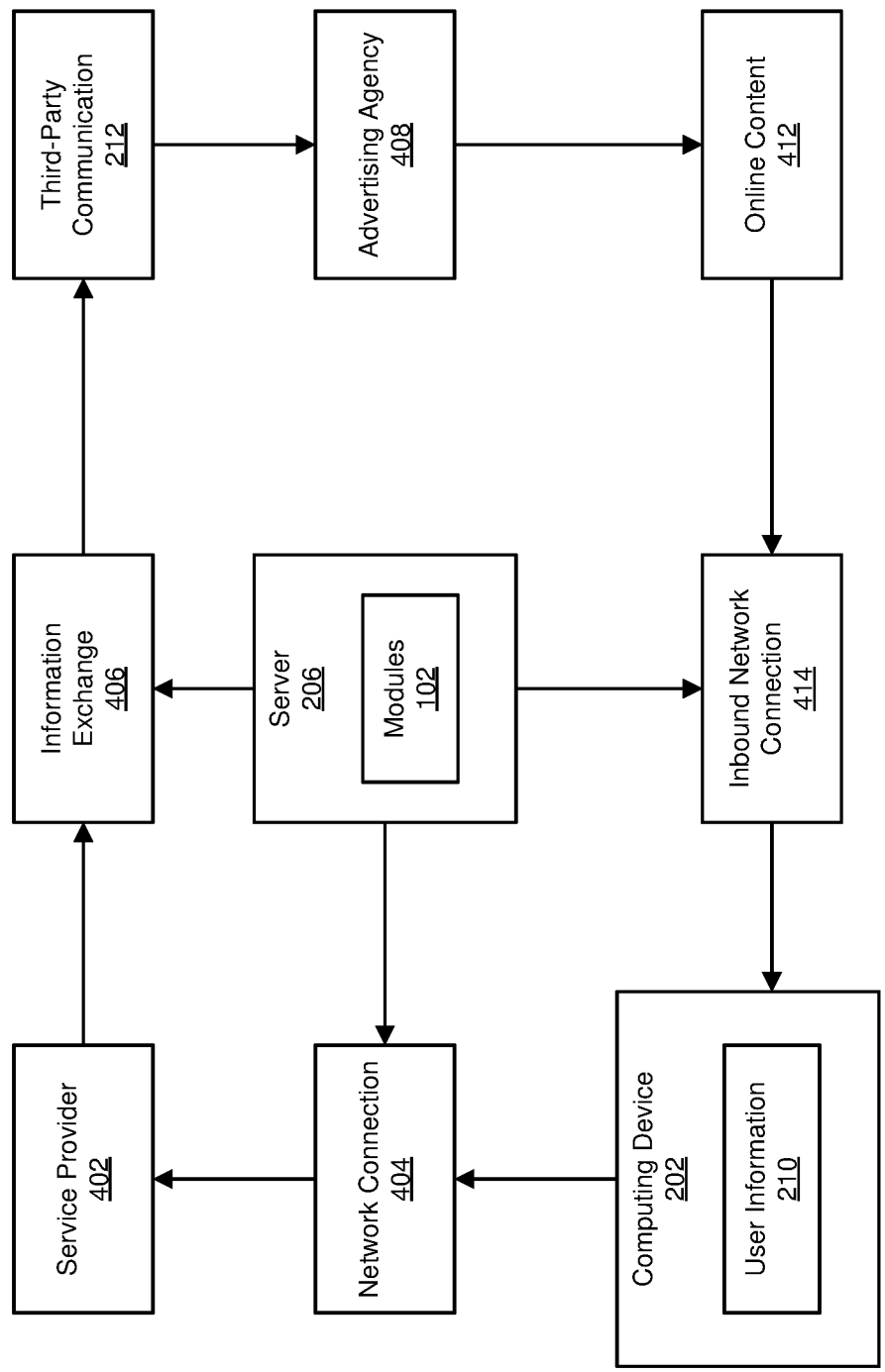
FIG. 4 is a block diagram of an example flow of user information through a network.

FIG. 4 is an illustrated example flow of user information through a network. In the example of FIG. 4, a user of computing device 202 may provide user information 210 to a service provider 402 over a network connection 404. As described in greater detail above, one or more elements of modules 102 may identify network connection 404 and record user information 210 as it is transmitted from computing device 202. Service provider 402 may then sell some or all of user information 210 to an information exchange 406. Information exchange 406 may then transmit third-party communication 212 to announce that bidding has opened on an opportunity to serve an ad to computing device 202. As described in greater detail above, various elements of modules 102 may participate and/or observe information exchange 406. Identification module 106 may accordingly be able to detect third-party communication 212 and recognize that information exchange 406 has acquired some or all of user information 210, thus indicating a flow of information from service provider 402 to information exchange 406.

Information may also flow back to computing device 202. For example, and as illustrated in FIG. 4, an advertising agency 408 may respond successfully to the bid (albeit potentially out of view of modules 102), and serve an advertisement to computing device 202, represented by online content 412, over an inbound network connection 414. An instance of identification module 106, perhaps executing as a component of a firewall or other network security software, may identify inbound network connection as containing an advertisement served from information exchange 406 using elements of user information 210. In this manner, the systems and methods described herein may infer the complete flow of user information 210 across disparate services and agencies to determine how the user's outbound information affects their browsing experience.

Once identification module 106 has identified third-party communication 212, other elements of modules 102 may analyze the collected communication(s). At step 306 in FIG. 3, one or more of the systems described herein may derive communication metadata from the third-party communication that describes both the third-party communication and the portion of the user information utilized by the third-party communication. For example, deriving module 108 may, as part of computing device 202 and/or server 206 in FIG. 2, derive communication metadata 122 from third-party communication 212 that describes both third-party communication 212 and the portion of user information 210 utilized by third-party communication 212.

Deriving module 108 may identify, extract, or otherwise derive a variety of information from third-party communication 212 for use as communication metadata 122. In some embodiments, deriving module 108 may extract and use information from HTTP headers found in third-party communication 212. Additionally or alternatively, deriving module 108 may determine the context in which third-party communication 212 was observed. For example, deriving module 108 may derive the time and/or network location at which third-party communication 212 was observed. As a specific example, if identification module 106 observes third-party communication 212 while monitoring a particular RTB advertising exchange, deriving module 108 may include information that identifies the time at which identification module 106 observed third-party communication 212 as well as an identifier of the specific RTB exchange. In some examples, deriving module 108 may derive the communication metadata from the third-party communication by identifying at least one purchaser that viewed the portion of the user information on the information exchange market. For example, identification module 106 may identify a third-party communication that represents an organization making a bid for user information on an information exchange. Deriving module 108 may then derive information from that communication that identifies the organization that made the bid and include this information as part of communication metadata 122.

Returning to FIG. 3 at step 308, one or more of the systems described herein may generate, based on the communication metadata and the recorded user information, an information flow report that describes the user information that was transmitted over the network connection, at least one third-party communication that utilized elements of the user information, and/or at least one element of user information utilized by the third-party communication. For example, generation module 110 may, as part of computing device 202 and/or server 206 in FIG. 2, generate, based on communication metadata 122 and the recorded user information 210, information flow report 124 that describes user information 210, third-party communication 212, and at least one element of user information 210 utilized by third-party communication 212.

Generation module 110 may generate a variety of information for use as information flow report 124. In some embodiments, generation module 110 may generate a table representing various elements of user information in association with contextual information that describes where that information went. For example, generation module 110 may add a table entry for a search term, e.g., "violin rosin", that a user entered into a search field managed by the online retailer, AMAZON.COM. Generation module 110 may associate this entry with information exchanges that traded this search term in association with information that identified computing device 202 and/or the user, as well as advertising services and other service providers that may have used this specific element of user information to serve content to computing device 202.

In some examples, generation module 110 may calculate a prevalence score for each element of user information included in the information flow report. This prevalence score may generally represent how many sources transmit, provide, share, or otherwise utilize various elements of user information 210. Generation module 110 may base a prevalence score for a specific element of user information 210 on a variety of factors, such as the number of third-party communications, information exchanges, and/or network connections inbound to computing device 202 that utilized. Additionally or alternatively, generation module 110 may generate an overall prevalence score for the user's personal information that represents the aggregate prevalence of all or a portion of user information 210 across a network.

Generation module 110 may also generate various visual representations of the above-described information. For example, generation module 110 may generate flow diagrams illustrating the movement of the user's data through a network ecosystem. Additionally or alternatively, generation module 110 may generate tables, lists, graphs, and/or any other suitable method of visually representing how the user's network activity likely affected their browsing experience. These visualizations may be presented to the user through a graphical user interface (GUI), as will be described in greater detail below.

At step 310 in FIG. 3, one or more of the systems described herein may provide the information flow report to the user via a graphical user interface (GUI). For example, providing module 112 may, as part of computing device 202 and/or server 206 in FIG. 2, provide information flow report 124 to the user via graphical user interface 218.

Providing module 112 may provide a variety of information through the GUI in a variety of formats. In general, providing module 112 may provide a visual representation of information flow report 124, as generated by generation module 110. Optionally, providing module 112 may allow a user to search, filter, or otherwise control what information is displayed through graphical user interface 218.

Figure 5:
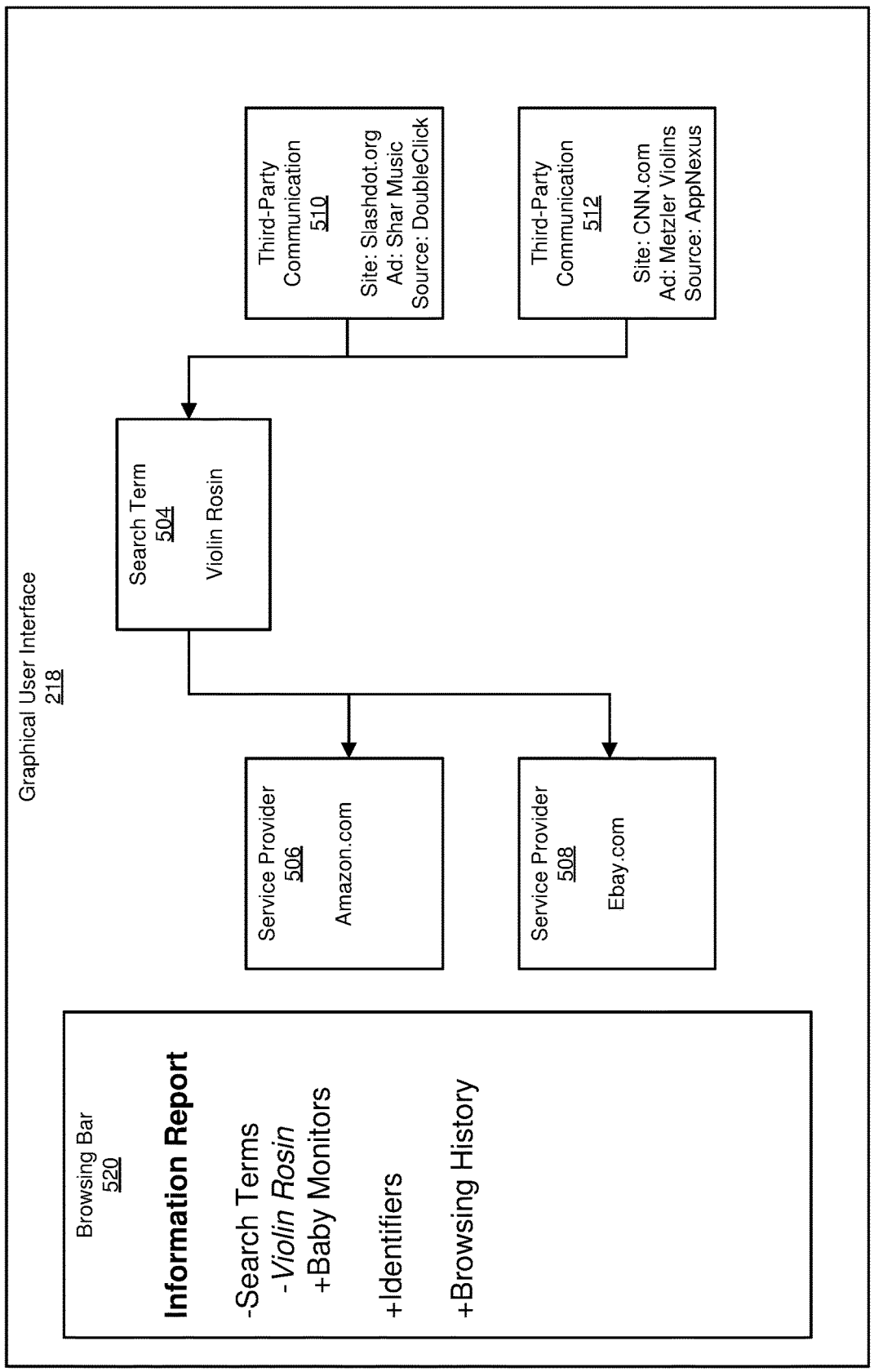
FIG. 5 is a block diagram of an example graphical user interface for communicating information flow reports to end users.

FIG. 5 is an illustrated example of a potential form of graphical user interface 218. As shown in FIG. 5, graphical user interface 218 may include a browsing bar 520 that contains a broad overview of elements whose information flows can be visualized in the display pane of graphical user interface 218. As illustrated in FIG. 5, browsing bar 520 may contain cascaded menus for broad categories of personal information, such as search terms, personal identifiers, and browsing history. Each of these broad categories may then be expanded to reveal specific elements of personal information. As shown in FIG. 5, the broad category "search terms" contains the specific elements "violin rosin" and "baby monitors".

In this example, a user has selected a visualization of search terms, and specifically selected to display the information flow for a search term 504, "violin rosin". As shown in graphical user interface 218, the user may have provided search term 504 to two different service providers, AMAZON.COM and EBAY.COM, represented in FIG. 5 as service provider 506 and service provider 508, respectively. Graphical user interface 218 may also include a visual representation of how that search term may have affected information coming back to the user, illustrated as third-party communication 510 and 512. In the example of FIG. 5, third-party communication 510 represents the service of an ad for "Shar Music" on the site SLASHDOT.ORG, as provided by the advertising agency DOUBLECLICK. Similarly, third-party communication 512 represents the service of an ad for "Metzler Violins" on the site CNN.COM, as provided by the advertising agency APPNEXUS. Graphical user interface 218 may display the linkages between the user being served these ads and the user providing search term 504 to service providers 506 and 508, as represented by the arrows indicating the flow of information to and from the user's computer.

In some embodiments, providing module 112 may, via the graphical user interface 218, prompt the user to initiate a security action that mitigates potential abuse of the user information. For example, a GUI may include an assortment of security actions to take against a specific service provider that may have misused user information. Additionally or alternatively The GUI may present these security actions to the user in a variety of ways, such as through dropdown menus, radio buttons, pop-up prompts, context menus, combinations of one or more of the same, or any other suitable method of allowing the user to indicate which, if any, security actions they would like to take. Providing module 112 may prompt the user to initiate a variety of security actions. For example, the security action may include notifying a website of a possible misuse of user information, blacklisting an abusing website from receiving at least one element of user information, whitelisting a reputable website to receive at least one element of user information, and/or any other suitable security action that protects the user's personal information against misuse. If the user has selected a security action, providing module 112 may forward the request to perform the security action to any appropriate software, such as firewalls, routing software, and the like.

As explained above in connection with method 300 in FIG. 3, a digital privacy application may track the flow of user information through a network. For example, an integrated online privacy solution may monitor information that a user provides to various online services, such as shopping sites and search engines, then track advertising exchanges that might use that information to serve ads back to the user. The online privacy solution may then use this information to generate visualizations of how the user's information has moved through the Internet and may additionally estimate how widespread the user's information may be. An element of the privacy solution local to the user's computer may display these visualizations to the user, and optionally provide methods for the user to trigger security responses in order to prevent the sharing of information that the user may not want to share.

Figure 6:
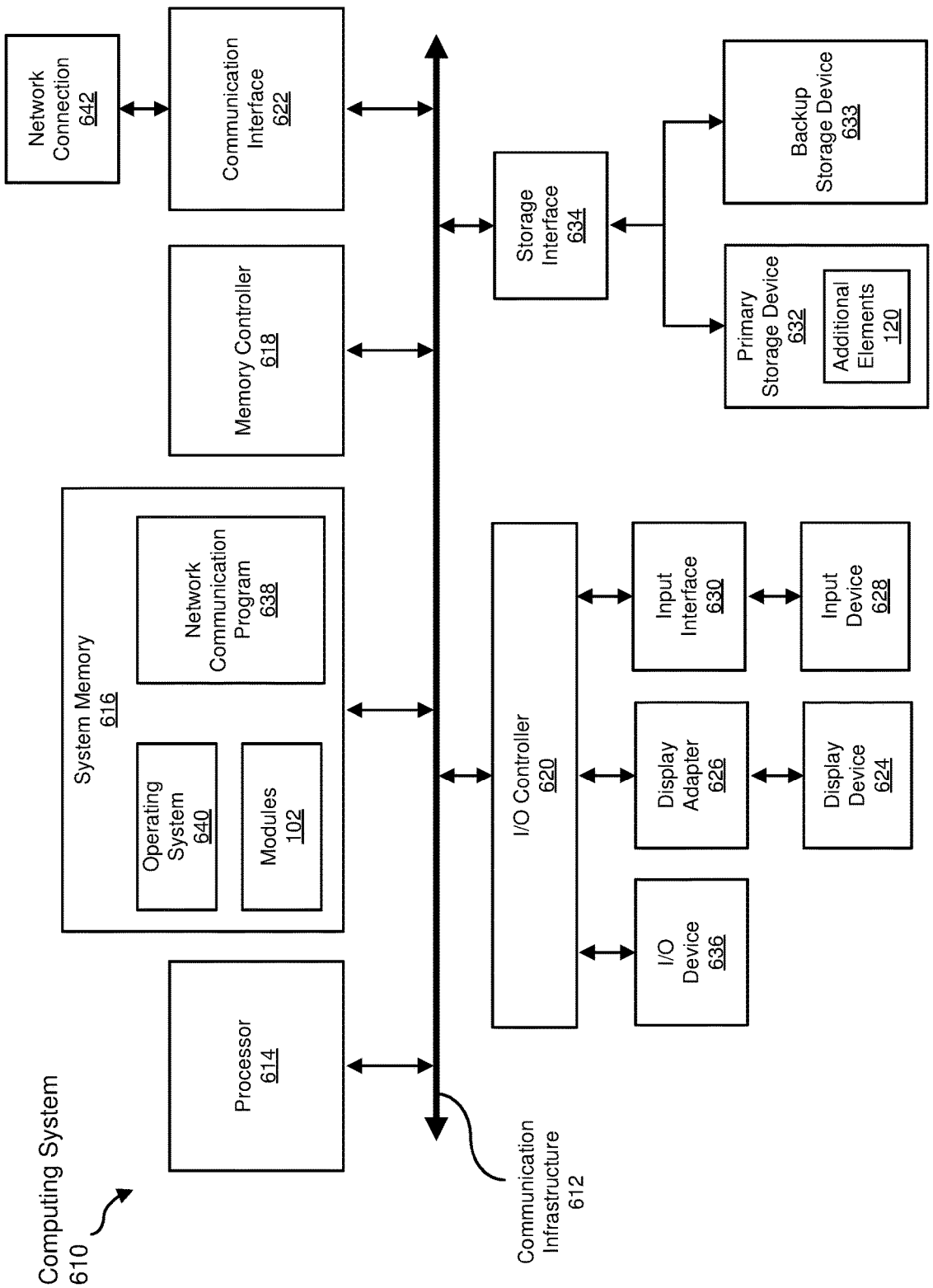
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, communication metadata 122 and/or information flow report 124 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
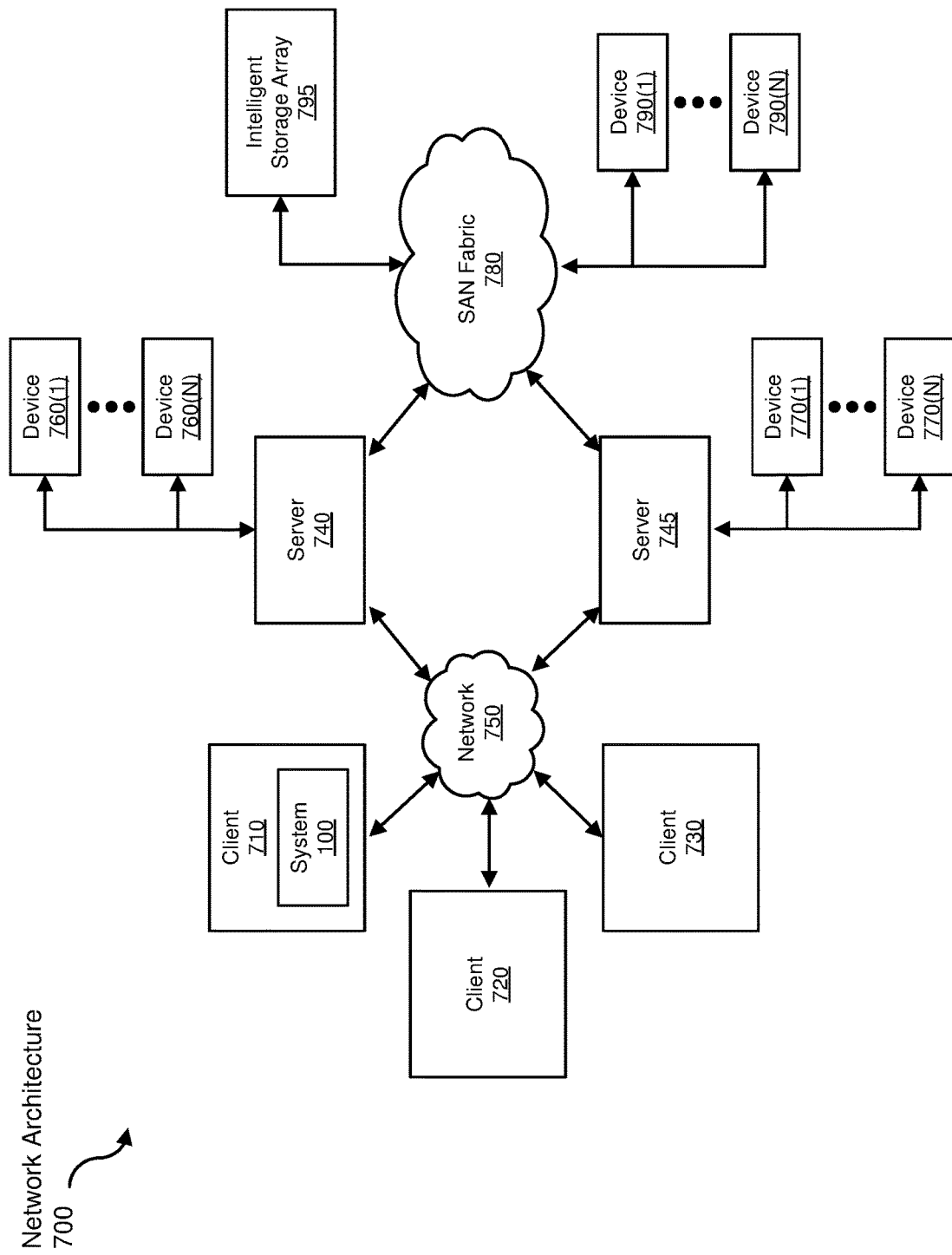
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for tracking the flow of user information over a network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may record user information, use the recorded user information to identify third-party communications to be transformed, transform the third-party communications into communication metadata, further transform the communication metadata into an information flow report, store the information flow report to a storage device, output the information flow report to a graphical user interface, receive a response from a user through the graphical user interface, and/or transform the response into a security action that protects the user's personal information against misuse by third parties. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for tracking the flow of user information over a network, at least a portion of the method being performed by a computing device comprising at least one processor, the method comprising:
   recording user information transmitted from a user's computing device over a network connection as part of an outbound communication;
   determining, based on searching a digital information exchange for portions of the user information, that at least a portion of the user information that was transmitted from the user's device was publicly traded among a plurality of digital service providers;
   identifying at least one third-party communication involving a digital service provider in the plurality of digital service providers that utilizes the portion of the user information to deliver content to the user's computing device;
   in response to identifying the third-party communication that utilizes the portion of the user information, deriving communication metadata from the third-party communication that describes both the third-party communication and the portion of the user information utilized by the third-party communication;
   associating, based on the user information recorded from the outbound communication and the communication metadata of the third-party communication, the portion of the user information with the outbound communication, the digital service provider, and the third-party communication;
   generating, based on the association between the portion of the user information, the outbound communication, the digital service provider, and the third-party communication, an information flow report that describes the association between the user information, the outbound communication, the digital service provider, and the third-party communication;
   providing the information flow report to the user via a graphical user interface (GUI) of a privacy application, the GUI comprising:
      a visual representation of the association between the user information, the outbound communication, the digital service provider, and the third-party communication; and
      content controls that enable the user to select differing visualizations of differing portions of the information flow report; and
   prompting, via the GUI, the user to initiate a security action that mitigates potential abuse of the user information by preventing sharing of portions of the user information, thereby enabling the user to respond to the information contained in the information flow report.

2. The method of claim 1, wherein searching the digital information exchange comprises searching an information exchange market for transactions that include the portion of the user information.

3. The method of claim 2, wherein deriving the communication metadata from the third-party communication comprises identifying at least one purchaser that viewed the portion of the user information on the information exchange market.

4. The method of claim 2, wherein the information exchange market comprises a real-time bidding advertising exchange.

5. The method of claim 1, wherein identifying the third-party communication comprises examining at least one inbound network connection to the user's computing device for communications that include the portion of the user information.

6. The method of claim 5, wherein the inbound network connection originated from a server known to be associated with an advertising service.

7. The method of claim 1, wherein the security action comprises performing at least one of:

notifying a website of a possible misuse of user information;

blacklisting an abusing website from receiving at least one element of user information; and whitelisting a reputable website to receive at least one element of user information.

8. The method of claim 1, wherein generating the information flow report comprises calculating a prevalence score for each element of user information included in the information flow report.

9. The method of claim 1, wherein the portion of the user information comprises at least one of:

a target URL of the network connection;

a parameter delivered to the target of the network connection;

an externally visible Internet Protocol (IP) address of the user's computing device; and information delivered over the network connection as part of a HyperText Transfer Protocol (HTTP) POST operation.

10. The method of claim 1, wherein recording the user information transmitted from the user's computing device comprises recording the user information at a gateway network device that facilitates network traffic for the user's computing device.

11. A system for tracking the flow of user information over a network, the system comprising:

a recording module, stored in a memory of the system, that records user information transmitted from a user's computing device over a network connection as part of an outbound communication;

an identification module, stored in the memory, that:

determines, based on searching a digital information exchange for portions of the user information, that at least a portion of the user information that was transmitted from the user's device was publicly traded among a plurality of digital service providers; and identifies at least one third-party communication involving a digital service provider in the plurality of digital service providers that utilizes the portion of the user information to deliver content to the user's computing device;

a deriving module, stored in the memory, that derives, in response to identifying the third-party communication that utilizes the portion of the user information, communication metadata from the third-party communication that describes both the third-party communication and the portion of the user information utilized by the third-party communication;

a generation module, stored in the memory, that:

associates, based on the user information recorded from the outbound communication and the communication metadata of the third-party communication, the portion of the user information with the outbound communication, the digital service provider, and the third-party communication; and generates, based on the association between the portion of the user information, the outbound communication, the digital service provider, and the third-party communication, an information flow report that describes the association between the user information, the outbound communication, the digital service provider, and the third-party communication;

a providing module, stored in the memory, that:

provides the information flow report to the user via a graphical user interface (GUI) of a privacy application, the GUI comprising:

a visual representation of the association between the user information, the outbound communication, the digital service provider, and the third-party communication; and content controls that enable the user to select differing visualizations of differing portions of the information flow report;

prompts, via the GUI, the user to initiate a security action that mitigates potential abuse of the user information by preventing sharing of portions of the user information, thereby enabling the user to respond to the information contained in the information flow report; and at least one physical processor configured to execute the recording module, the identification module, the deriving module, the generation module, and the providing module.

12. The system of claim 11, wherein the identification module searches the digital information exchange by searching an information exchange market for transactions that include the portion of the user information.

13. The system of claim 12, wherein the deriving module derives the communication metadata from the third-party communication by identifying at least one purchaser that viewed the portion of the user information on the information exchange market.

14. The system of claim 12, wherein the information exchange market comprises a real-time bidding advertising exchange.

15. The system of claim 11, wherein the identification module identifies the third-party communication by examining at least one inbound network connection to the user's computing device for communications that include the portion of the user information.

16. The system of claim 15, wherein the inbound network connection originated from a server known to be associated with an advertising service.

17. The system of claim 11, wherein the security action comprises performing at least one of:

notifying a website of a possible misuse of user information;

blacklisting an abusing website from receiving at least one element of user information; and whitelisting a reputable website to receive at least one element of user information.

18. A non-transitory computer-readable medium comprising one or more computer-readable instructions that, when executed by at least one processor of a computing device, cause the computing device to:

record user information transmitted from a user's computing device over a network connection as part of an outbound communication;

determine, based on searching a digital information exchange for portions of the user information, that at least a portion of the user information that was transmitted from the user's device was publicly traded among a plurality of digital service providers;

identify at least one third-party communication involving a digital service provider in the plurality of digital service providers that utilizes the portion of the user information to deliver content to the user's computing device;

in response to identifying the third-party communication that utilizes the portion of the user information, derive communication metadata from the third-party communication that describes both the third-party communication and the portion of the user information utilized by the third-party communication;

associate, based on the user information recorded from the outbound communication and the communication metadata of the third-party communication, the portion of the user's information with the outbound communication, the digital service provider, and the third-party communication;

generate, based on the association between the portion of the user information, the outbound communication, the digital service provider, and the third-party communication, an information flow report that describes the association between the user information, the outbound communication, the digital service provider, and the third-party communication;

provide the information flow report to the user via a graphical user interface (GUI) of a privacy application, the GUI comprising:
- a visual representation of the association between the user information, the outbound communication, the digital service provider, and the third-party communication; and
- content controls that enable the user to select differing visualizations of differing portions of the information flow report; and prompt, via the GUI, the user to initiate a security action that mitigates potential abuse of the user information by preventing sharing of portions of the user information, thereby enabling the user to respond to the information contained in the information flow report.

* * * * *